US010611577B2

(12) United States Patent
Engelmann et al.

(10) Patent No.: US 10,611,577 B2
(45) Date of Patent: Apr. 7, 2020

(54) COLD PLANER WITH SELF-ADJUSTING CONVEYOR SYSTEM

(71) Applicant: Caterpillar Paving Products Inc., Brooklyn Park, MN (US)

(72) Inventors: Eric S. Engelmann, Delano, MN (US); Colton J. Hirman, Maple Grove, MN (US); Nicholas J. Argenziano, Otsego, MN (US)

(73) Assignee: Caterpillar Paving Products Inc., Brooklyn Park, MN (US)

( * ) Notice: Subject to any disclaimer, the term of this patent is extended or adjusted under 35 U.S.C. 154(b) by 0 days.

(21) Appl. No.: 15/997,736

(22) Filed: Jun. 5, 2018

(65) Prior Publication Data

US 2019/0367286 A1 Dec. 5, 2019

(51) Int. Cl.
*B65G 23/44* (2006.01)
*B65G 43/00* (2006.01)
*E01C 23/12* (2006.01)
*E01C 23/088* (2006.01)

(52) U.S. Cl.
CPC .............. *B65G 23/44* (2013.01); *B65G 43/00* (2013.01); *E01C 23/088* (2013.01); *E01C 23/127* (2013.01)

(58) Field of Classification Search
CPC ....... B65G 23/44; B65G 43/00; E01C 23/088; E01C 23/127
USPC .................... 198/810.04, 812, 813
See application file for complete search history.

(56) References Cited

U.S. PATENT DOCUMENTS

| 3,545,599 | A | * | 12/1970 | Barber | B65G 39/16 198/807 |
|---|---|---|---|---|---|
| 3,923,151 | A | | 12/1975 | Weber | |
| 4,173,904 | A | * | 11/1979 | Repetto | C14B 1/34 198/807 |
| 4,284,192 | A | * | 8/1981 | Taylor | B65G 23/44 198/813 |
| 4,653,634 | A | | 3/1987 | Hansen | |
| 4,929,121 | A | | 5/1990 | Lent et al. | |
| 5,131,528 | A | * | 7/1992 | Bandy, Jr. | B65G 23/44 198/813 |
| 5,641,058 | A | * | 6/1997 | Merten | B65G 23/44 198/810.04 |
| 5,899,321 | A | * | 5/1999 | El-Ibiary | B65G 39/16 198/807 |
| 6,695,130 | B1 | * | 2/2004 | Blaylock | B65G 23/44 198/813 |

(Continued)

FOREIGN PATENT DOCUMENTS

| CN | 202201438 | 4/2012 |
|---|---|---|
| CN | 203624396 | 6/2014 |

(Continued)

*Primary Examiner* — Douglas A Hess
(74) *Attorney, Agent, or Firm* — Schwegman, Lundberg & Woessner

(57) ABSTRACT

A cold planer including a conveyor system coupled to a frame. The conveyor system includes a conveyor with a conveyor belt that rotates about a conveyor roller. A belt tensioning system is coupled to the conveyor roller and includes an actuator for moving the conveyor roller to place tension on the conveyor belt. One or more processors are configured to receive information related to the conveyor belt and adjust the actuator on the conveyor belt based on the information related to the conveyor belt to provide a constant operating tension on the conveyor belt.

20 Claims, 5 Drawing Sheets

(56) References Cited

U.S. PATENT DOCUMENTS

| | | | | |
|---|---|---|---|---|
| 6,834,228 | B2 | 12/2004 | Serkh et al. | |
| 7,798,313 | B2* | 9/2010 | Hesketh | B65G 23/44 |
| | | | | 198/814 |
| 7,866,462 | B2 | 1/2011 | DeMong | |
| 8,636,140 | B2* | 1/2014 | Tout | B65G 23/44 |
| | | | | 198/814 |
| 8,807,331 | B2* | 8/2014 | Beltman | B65G 23/44 |
| | | | | 198/806 |
| 8,960,417 | B2 | 2/2015 | Vasey | |
| 9,156,619 | B2* | 10/2015 | Buschmann | B65G 23/44 |
| 9,522,789 | B1 | 12/2016 | Rimmington | |
| 9,533,831 | B2* | 1/2017 | Nelson | B65G 43/02 |
| 9,656,811 | B2* | 5/2017 | Hood | B65G 23/44 |
| 9,776,803 | B2* | 10/2017 | Rimmington | E21F 13/06 |
| 10,071,862 | B1* | 9/2018 | Barry | B65G 23/44 |
| 10,149,437 | B2* | 12/2018 | Van Overschelde | A01F 12/10 |
| 10,308,440 | B2* | 6/2019 | Marsolek | B65G 67/22 |
| 2017/0297825 | A1 | 10/2017 | Watson et al. | |
| 2019/0009989 | A1 | 1/2019 | Francisco | |

FOREIGN PATENT DOCUMENTS

| | | |
|---|---|---|
| CN | 204399994 | 6/2015 |
| CN | 204416346 | 6/2015 |
| CN | 104326236 | 5/2016 |
| CN | 206705106 | 12/2017 |
| CN | 107054996 | 3/2019 |
| DE | 102005028091 | 12/2006 |
| GB | 873306 | 7/1961 |
| GB | 2042453 | 9/1980 |
| JP | 4187429 | 11/2008 |
| JP | 2008279314 | 11/2008 |

* cited by examiner

COLD PLANER WITH SELF-ADJUSTING CONVEYOR SYSTEM

TECHNICAL FIELD

This disclosure relates to a cold planer. More particularly, to a cold planer with a self-adjusting conveyor system.

BACKGROUND

Cold planers, sometimes also called road mills, scarifiers, or surface treatment machines, rotate a drum with cutting bits over a work surface. These machines are designed to prepare or treat a surface like a road, pavement, or soil. A motor connected to the drum by way of a drive train and gearbox rotates the drum so that the cutting bits alter the work surface. The cold planer also includes a conveyor system that generally has a primary conveyor that receives debris cut by the drum and transfers the debris to a secondary conveyor. The secondary conveyor then transports the debris away from the machine to a truck for removal.

Conveyor belts of the conveyor system are monitored by a worker or cold planer operator. As work load on the belts increases, tension on the belts similarly increases. The worker or operator observes the belt and when a problem is noticed such as a lose belt or a mis-tracked belt, tension on the belt is adjusted by repositioning the end roller of a conveyor. Often operators of cold planers use hand tools to mechanically adjust the tension in the conveyor system. This is typically performed with a threaded rod connected to the support bearings for the head pulleys of the conveyor belt. When the belt is in need of adjustment, the operators use hand tools to manually adjust the tension of both sides of the belt until it is tensioned and tracking correctly. In many cases, operators perform these adjustments with the belts running as it is necessary for the belt to rotate in order for the adjustments to take effect. Not only is this not user friendly, user error can result in undesired over-tensioning on the belts leading to belt wear, reduced belt life, reduced lift of conveyor components such as bearings, rollers and pulleys, and inefficient performance of the conveyor.

Other conveyor belt systems utilize a controller. Chinese Pat. No. CN206705106U to Yinghua presents a conveyor belt tension adjusting machine. The machine has dual clutch piston cylinders and pressure sensors. A PLC controller is provided to dynamically adjust the belt tension to maintain a symmetrical arrangement of two cylinders during operation.

Still, conveyor belt tensioning systems remain susceptible to wear, over-tensioning, and reduced life. Difficulties in use and maintenance also persist.

SUMMARY OF THE INVENTION

In one aspect of the invention a cold planer is provided with a frame and a conveyor system coupled to the frame. The conveyor system includes a conveyor that includes a conveyor belt that rotates about a plurality of conveyor rollers. The conveyor system also includes a belt tensioning system coupled to a conveyor roller and including an actuator for moving the conveyor roller to vary tension on the conveyor belt. The cold planer also includes one or more processors configured to receive information related to the conveyor belt and adjust the actuator on the conveyor belt based on the information related to the conveyor belt to provide a constant operating tension on the conveyor belt.

In another aspect of the invention, a belt tensioning system for coupling to a conveyor roller is provided. The belt tensioning system includes a first actuator and second actuator that both move the conveyor roller to vary tension on the conveyor belt. The belt tensioning system also includes one or more processors configured to receive information related to the conveyor belt, determine a non-operational state of the conveyor belt based on the load information, and adjust the first actuator or second actuator to move the conveyor roller from an operational position to a non-operational position in response to determining the non-operational state to remove tension on the conveyor belt.

In yet another aspect of the invention, a cold planer is provided with a frame and a conveyor system coupled to the frame. The conveyor system includes a conveyor that includes a conveyor belt that rotates about a plurality of conveyor rollers. The conveyor system also includes a belt tensioning system coupled to a conveyor roller and including a first actuator for moving the conveyor roller to vary tension on the conveyor belt and a second actuator for moving the conveyor roller to vary tension on the conveyor belt. The belt tensioning system also includes one or more processors configured to receive information related to the conveyor belt, receive an input from an operator to move the conveyor roller, select either the first actuator or second actuator to adjust based on the information related to the conveyor belt, and adjust the selected first actuator or second actuator to move the conveyor roller based on the input from the operator.

DETAILED DESCRIPTION

Figure 1:
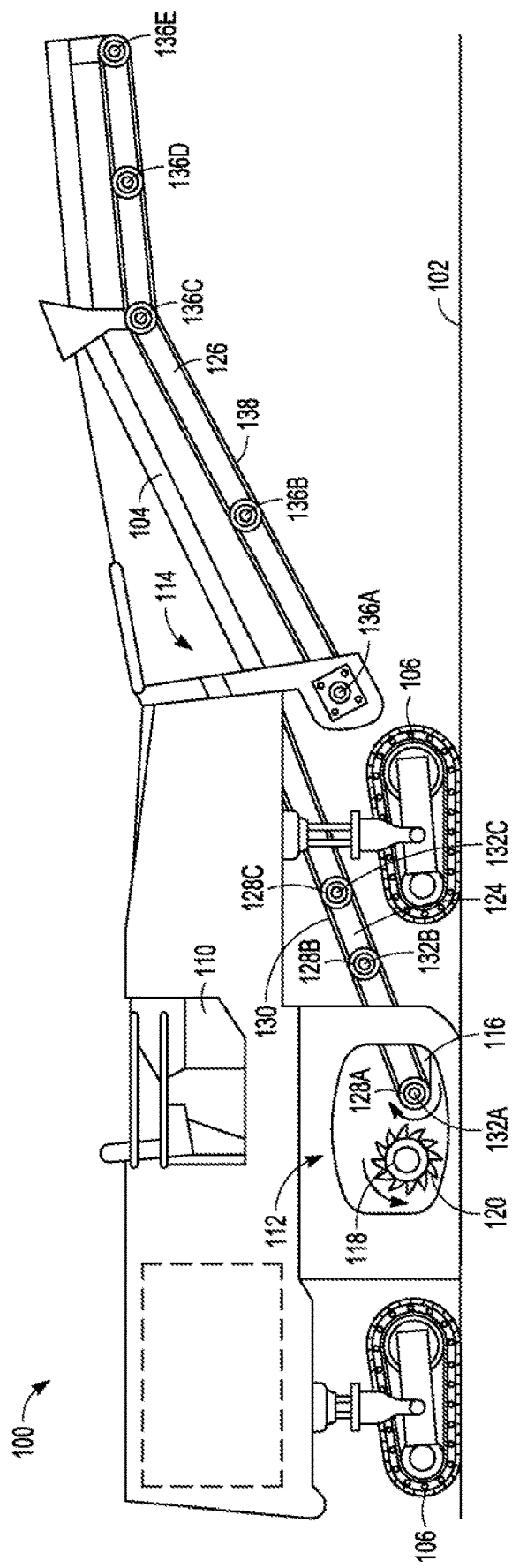
FIG. 1 shows a diagrammatic illustration of an exemplary cold planer machine.

FIG. 1 illustrates portions of an exemplary cold planer machine 100. The cold planer 100 traverses over a surface 102 such as a roadway, parking lot, concrete pathway, or the like to cut, grind, and remove pieces or parts of the surface 102. Specifically, the cold planer 100 includes a frame 104, tracks 106, control system 110 milling system 112, conveyor system 114, and a belt tensioning system 116.

The milling system 112 is coupled to the frame 104 and in an example includes a milling drum 118 that has cutting elements 120 thereon for cutting or milling the surface 102 creating debris. The debris is received by the conveyor system 114 for conveyance to a vehicle or container for removal of the debris.

The conveyor system 114 is also coupled to the frame 104 and can include a first conveyor 124 and a second conveyor 126. The first conveyor 124 includes a plurality of conveyor rollers 128A, 128B, and 128C each that receives a first conveyor belt 130 for rotation around the conveyor rollers 128A, 128B, and 128C. Each roller 128A, 128B, and 128C includes bearings 132A, 132B, and 132C upon which an outer drum rotates. The second conveyor 126, similar to the first conveyor 124, includes a plurality of conveyor rollers 136A, 136B, 136C, 136D, 136E. Each conveyor roller 136A-E receives a second conveyor belt 138 that rotates about the conveyor rollers 136A-E in a manner similar to that of the first conveyor 124.

The belt tensioning system 116 illustrated is coupled to end conveyor roller 128A of the first conveyor 124. In an example, the belt tension system 116 is coupled to the bearing 132A of that conveyor roller 128A and in another example is coupled directly to the frame 104. While illustrated as on the end conveyor roller 128A of the first conveyor 124, the belt tensioning system 116 can be coupled to the other end conveyor roller (not shown) of the first conveyor 124, or to an end conveyor roller 136A or 136E of the second conveyor 126 in other embodiments. Additionally, the belt tensioning system 116 can be a first belt tensioning system coupled to the first conveyor 124, and a second belt tensioning system can be coupled to the second conveyor 126 for tensioning control over both the first and second conveyor belts 130, 138. In one example, the belt tension system 116 is coupled to the control system 110 such that the control system 110 controls operation of the belt tensioning system 116.

Figure 2:
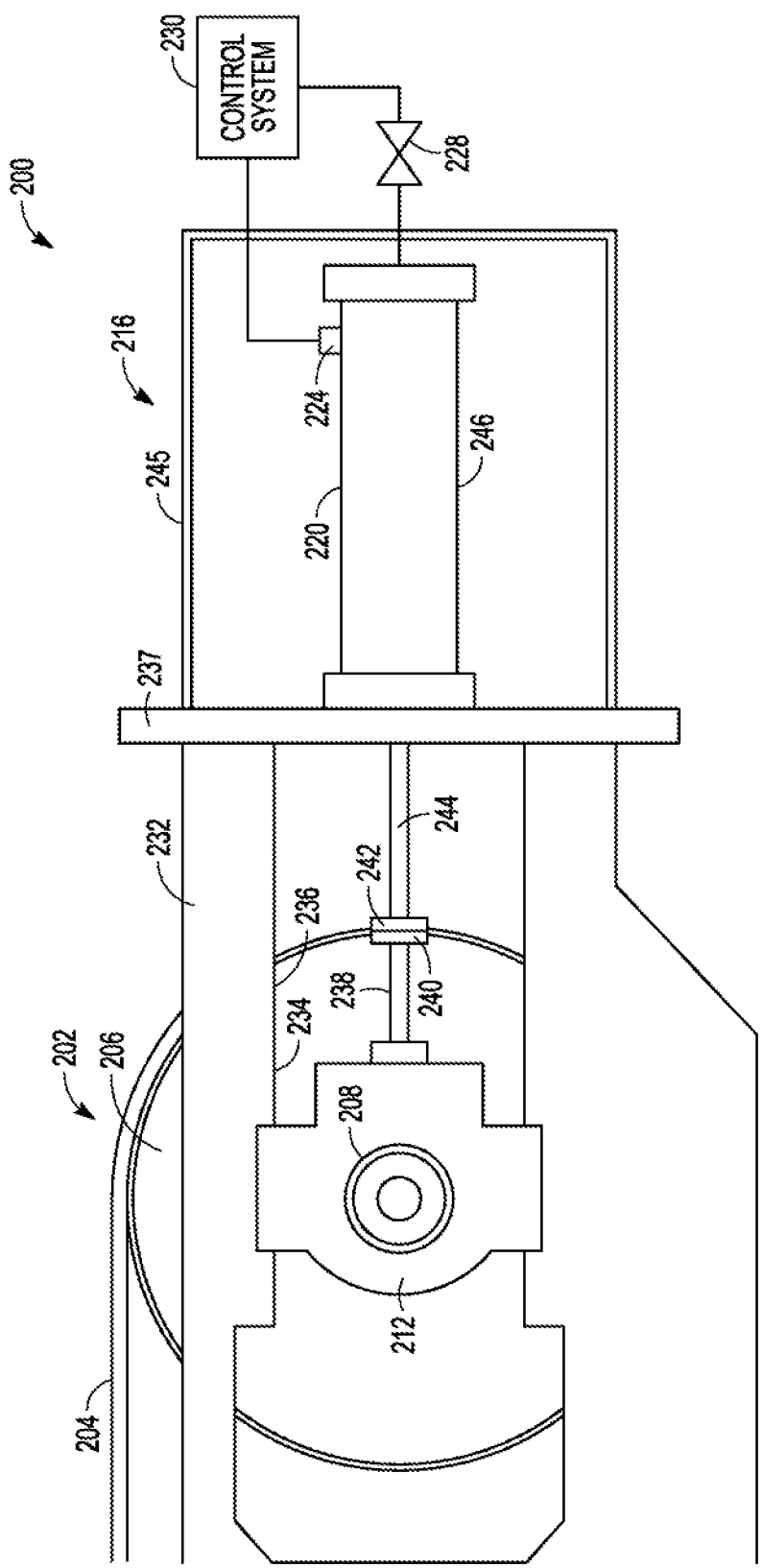
FIG. 2 shows a side plan view of an exemplary belt tensioning system.
Figure 3:
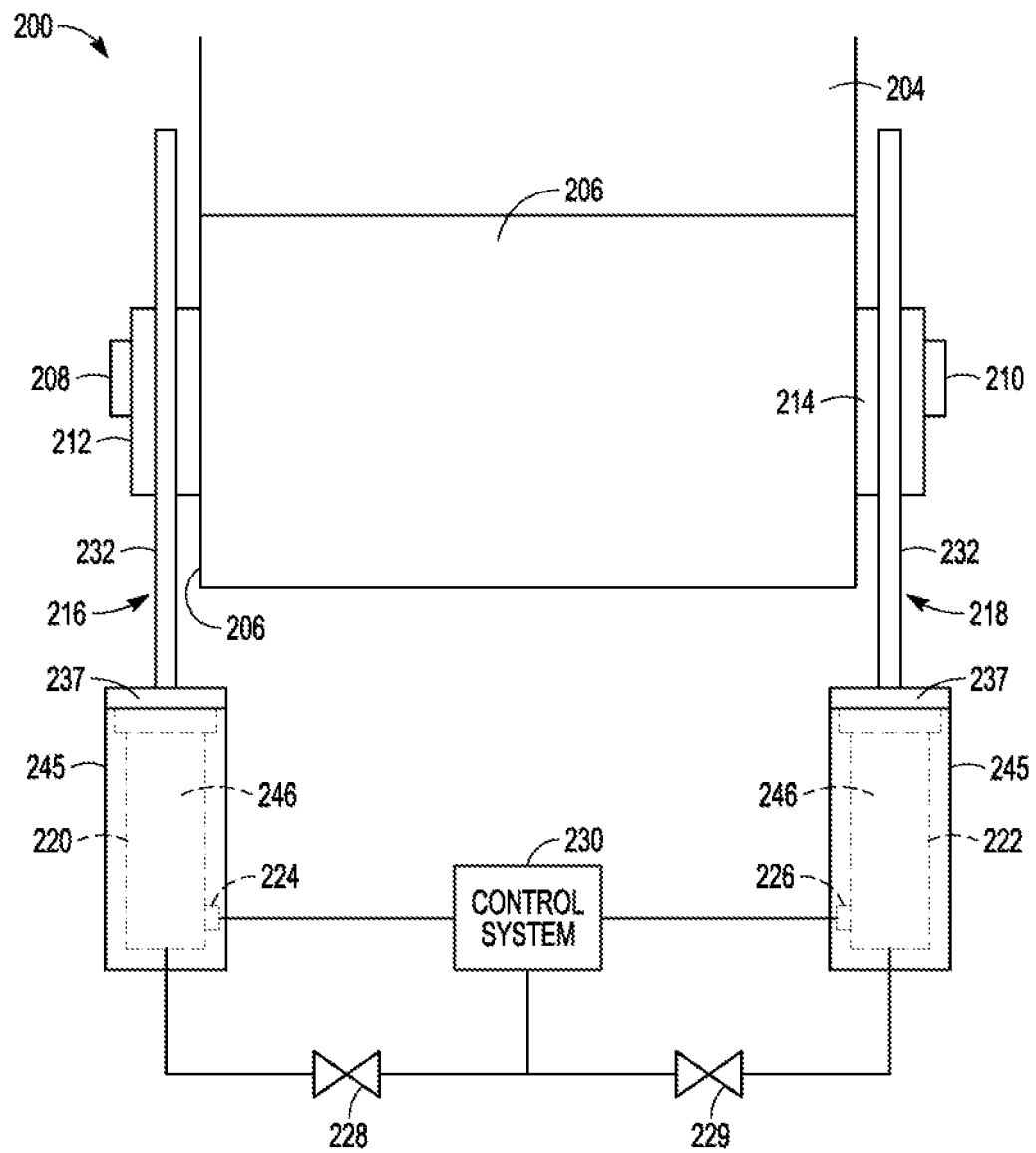
FIG. 3 shows a top schematic view of an exemplary belt tensioning system.

FIGS. 2 and 3 illustrate an exemplary belt tensioning system 200, that in an example is the belt tensioning system 116 illustrated in FIG. 1. The belt tensioning system 200 is coupled to a conveyor 202 with a conveyor belt 204 to adjust the tension on the conveyor belt based on a determined force, such as in lbf (pounds force). In one example, the conveyor 202 is the first conveyor 124 of FIG. 1. In another example the conveyor 202 is the second conveyor 126 of FIG. 1.

In the illustrated examples, the belt tensioning system 200 is coupled to an end conveyor roller 206 of a plurality of conveyor rollers. In an example, the belt tensioning system 200 is coupled to the first and second bearings 208, 210 of the end conveyor roller 206. In another example, the end conveyor roller 206 is an end conveyor roller of the plurality of conveyor rollers 128A-C of the primary conveyor 124 of FIG. 1. In yet another example, the end conveyor roller 206 is an end conveyor roller of the plurality of conveyor rollers 136A-E of the secondary conveyor 126.

The belt tensioning system 200 includes a first arm 212, second arm 214, first adjustment mechanism 216, second adjustment mechanism 218, first actuator 220, second actuator 222, first actuator sensor 224, second actuator sensor 226, a first valve 228, a second valve 229, and a control system 230, such as a machine including machine readable medium with instructions that are executed by one or more processors.

The first and second arms 212 and 214 are each coupled to a bearing 208, 210 of conveyor roller 206. In one example the first and second arms 212, 214 are secured to first and second bearings 208, 210 spaced on either side of the conveyor roller 206, respectfully. The first arm 212 includes the first adjustment mechanism 216 and the second arm 214 includes the second adjustment mechanism 218. In this example, the adjustment mechanisms 216, 218 are coupled to the bearings 208, 210 of the end conveyor roller 206 such that when either adjustment mechanism 216, 218 is moved, the attached bearing 208, 210 is pushed away from the first and second actuators 220, 222 or pulled toward the first and second actuators 220, 222. In this example, when pushed away from the actuators 220, 222, the movement decreases or removes tension on the conveyor belt 204, and when pulled toward the first and second actuators, the movement increases or adds tension to the belt 204. In an alternative embodiment, the first and second actuators 220, 222 are positioned such that pushing a bearing 208, 210 away from an actuator 220, 222 results in increasing or adding tension to the conveyor belt 204, while pulling the bearing 208, 210 toward the actuators 220, 222 results in decreasing or removing tension on the conveyor belt 204.

Each adjustment mechanism 216, 218 in one example includes a frame 232 that is coupled to the frame of the cold planer, that in one embodiment is the frame 104 of cold planer 100. The frame 232 includes an opening 234 that is of size and shape to accommodate an arm 212, 214 such that the arm 212, 214 slidably engages a periphery 236 of the opening 234. The frame 232 at one end includes a mounting end plate 237 that defines one side of the opening 234 within the frame 232. Each arm 212, 214 includes a rod element 238 that includes a mounting plate 240 that is secured to a mounting plate 242 of a coupling section 244 of an actuator 220, 222 where the coupling section 244 extends through the mounting end plate 237 of the frame 232.

Each actuator 220, 222 in an example includes a frame 245 that engages and is coupled to the mounting end plate 237 of the adjustment mechanism 216, 218. Each actuator 220, 222 also includes a body 246 that in one example is generally cylindrical, with the coupling section 244 extending from the body 246, through the frame 245 of the actuator 220, 222, and through mounting end plate 237 to couple to an arm 212 at the mounting plates 240, 242 as described. In one example, each actuator is a hydraulic cylinder and rod element 238 is part of, or coupled to, the piston of the hydraulic cylinder that moves based on the hydraulic pressure within the hydraulic cylinder. In another example, each actuator 220, 222 includes a locking valve to hold the actuators 220, 222 at the desired position. In one example, each valve 228, 229 operates as the locking valve of each actuator 220, 222 respectfully.

Each of the actuators 220, 222 is coupled to an actuator sensor 224, 226. In one example, the actuator sensors 224, 226 are position sensors that determine the distance the rod element 238 moves. In other examples, the actuator sensors 224, 226 are pressure sensors, optical sensors, sonic sensors, laser sensors, or the like. Each actuator sensor 224, 226 is coupled to a control system 230 to convey information or data related to each actuator 220 to the control system for processing. The sensed information is then utilized by the control system 230 to determine the tension on the conveyor belt 204. In an example, the sensed information is related to belt tension, such as actuator pressure, position, motor pressure, or the like that can be utilized in association with look-up tables, calculations, or comparisons to determine the load and/or tension on the belt at a given time.

In one example, first valve 228 is fluidly coupled to the first actuator 220 while the second valve 229 is coupled independent of the first valve 228. In this manner, the first and second valves 228, 229 are not dependent on one another such that actuation of the first actuator 220 does not affect cause actuation of the second actuator 222. Thus, the first and second valves operate independent to one another. Each valve also is able to provide a lock for the corresponding actuator to prevent movement of the actuator 220 or 222, including during operation. The first and second valves 228, 229 can be of any type, including a solenoid valve.

In another example, a single valve is fluidly coupled to the actuators 220, 222 to supply fluid to the actuators 220, 222 for movement of the actuators 220, 222. The valve can be of any type, including a solenoid valve and is fluidly connected between the actuators 220, 222, such that when actuated, the valve varies pressure in at least one actuator 220, 222. In an example, pressure in one actuator 220, 222 is decreased while increasing pressure in the other actuator 220, 222.

The control system 230 in one example is coupled to the first and second actuator sensors 224, 226 independent of a control system of the cold planer. In another example, the control system 230 is a main controller of the cold planer that controls and operates other system of the cold planer, including, but not limited to the propel system 122, the milling system 124, and the like. In one embodiment of such an example, the control system 230 is the control system 110 of cold planer 120 of FIG. 1. In another example the control system 230 is a program logic controller (PLC).

The control system 230 in an example receives inputs from additional sensors, including but not limited to a motor sensor, a conveyor belt sensor, or the like. The control system 230 based on the information or data received from sensors, including actuator sensors 224, 226 determines the desired position of a bearing 208, 210 and adjusts an actuator 220, 222 to move the bearing 208, 210 to that position. The adjustment in one example is provided via actuation of a valve 228, 229. The determined movement can be based on only information from a single sensor such as one of the actuator sensors 224, 226, a motor sensor, a belt sensor, and the like. Alternatively, the determined movement can be based on information received from more than one of the sensors, including the actuator sensors 224, 226, motor sensor, and belt sensor.

The control system 230 in one example is a machine that receives and instructions and has one or more processors that execute the instructions. In an example, based on instructions, the control system 230 actuates the actuators 220, 222 to incrementally move, or provide movements of the end conveyor roller 206 at predetermined positions, to position the end conveyor roller 206. In this manner, the movements can mimic movements and adjustments known to operators. As an example, each predetermined positions may be related to the turns on a nut element an operator makes to move the end conveyor roller 206 a predetermined distance. So, in one embodiment, the incremental movement of the end conveyor roller 206 is the same as the movement when a nut element of a manual adjustment tensioning system is given a quarter (¼) of a turn. In this manner the operator observing the operation of the belt tensioning system 200 has a better understanding of the operation of the belt tensioning system 200 to ensure proper operation of the system 200.

Figure 4:
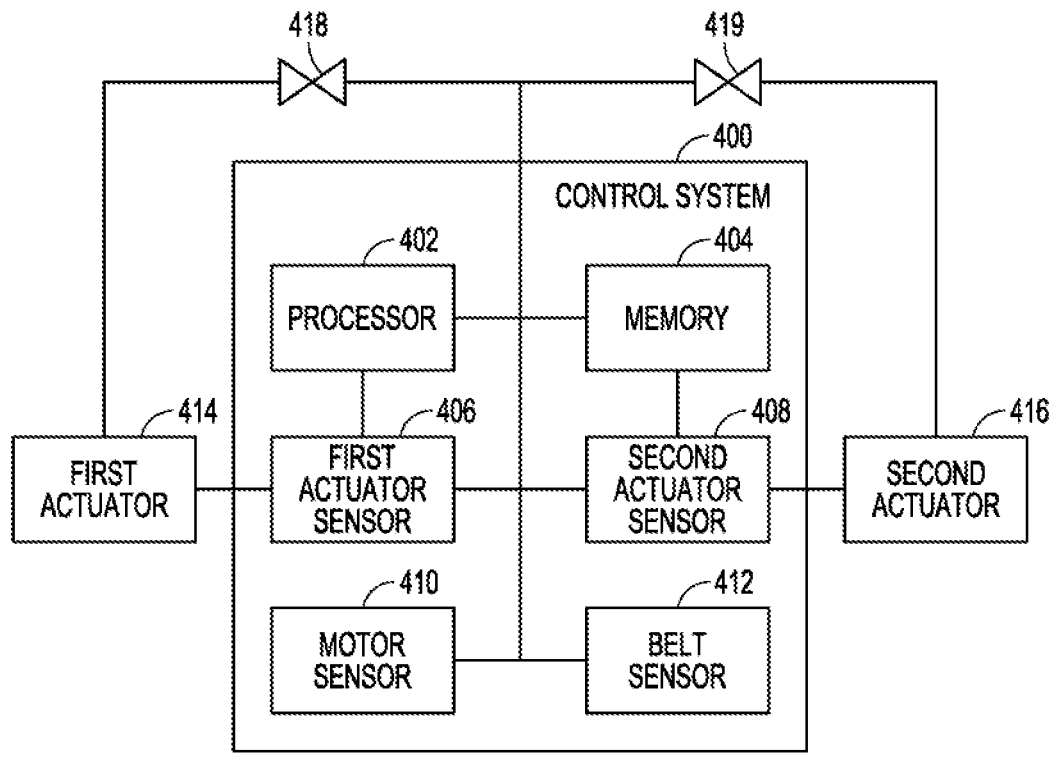
FIG. 4 shows a schematic block diagram of an exemplary control system.

FIG. 4 illustrates a schematic diagram of an exemplary control system 400 that can be utilized to perform any of the techniques or methods described herein. The control system 400 in an example is a control system of a cold planer that is the control system 110 of cold planer 100 of FIG. 1. In another example the control system 400 is coupled to the control system 110 of the cold planer 100 of FIG. 1. Alternatively, the control system 400 is independent of the control system 110 of the cold planer 100 of FIG. 1.

The control system 400, includes one or more processors 402 and a memory 404. The one or more processors 402 are configured to receive sensor output, including from a first actuator sensor 406, second actuator sensor 408, motor sensor 410, belt sensor 412, or the like. From these system sensors 406, 408, 410, 412 the one or more processors 402 receive load information related to the conveyor belt. Load information can include, but is not limited to pressure readings related to the actuators, position readings related to the actuators, pressure readings related to the motor, or any other reading from a system sensor 406, 408, 410, 412.

The control system 400 is coupled to a first actuator 414, second actuator 416, first valve 418, and second valve 419 such that in response to load determinations based on the load information, the control system 400 adjusts the first actuator 414 and/or second actuator 416. In one example, the first actuator 414, second actuator 416, first valve 418, and second valve 419 are the first actuator 220, second actuator 222, first valve 228, and second valve 229 of the example embodiment of FIGS. 2-3. The one or more processors 402 are configured, based on the received load information, to determine the desired position of each actuator 414, 416 and adjust the actuators 414, 416 to provide a desired tension on the belt. In one example, the desired tension is within a targeted tension range. In another example, the desired tension is below a threshold tension. In yet another example, the desired tension is the nominal tension of the belt. Nominal tension is the minimum tension needed to avoid belt slip at a maximum or full load on the conveyor belt. In another example, the desired tension is the minimum tension required to prevent slippage of the conveyor belt on the conveyor rollers when the conveyor belt is below a maximum or full load. These determinations can be made through a comparison of sensed load information to a data field, through look-up tables, calculated, or the like. Consequently, the control system 400 adjusts the actuators 414, 416 accordingly to provide optimal tension on the belt through all operational conditions. In one example, the valves 418, 419 are controlled by the control system 400 to independently control the first and second actuators 414, 416 such that one actuator adjusts position while the other actuator remains in a fixed position.

INDUSTRIAL APPLICABILITY

Disclosed exemplary systems and methods provide a cold planer 100 that includes a belt tensioning system 116, 200 with a control system 110, 230, 400 that minimizes conveyor belt wear, reduces over tensioning of the conveyor belt 130, 138, 204, facilitates conveyor belt adjustments, and increases precision in end conveyor roller positioning. The adjustment of actuators 220, 222, 414, 416 in one example is provided by actuation of a valve 228, 229, 418, 419 that independently supply and remove fluid from each actuator 220, 222, 414, 416. In an example, the first actuator 220, 414 is moved a first distance to move one bearing 132A-C or 208, 210 of the end conveyor roller 206 a first distance and the second actuator 222, 416 is moved a second distance to move another bearing 132A-C or 208, 210 of the end conveyor roller 206 a second distance. In one embodiment, that first and second distance are the same, in another embodiment the first and second distance are different. In one example, only one actuator 220, 222, 414, 416 moves a bearing 132A-C, or 208, 210 of the end conveyor roller 206 at a given time.

In one example, an actuator 220, 222, 414, 416 moves as a result of input from a conveyor operator. When the conveyor operator recognizes certain loading is being placed on the conveyor and an adjustment to the conveyor needs to be made, the operator provides input into the control system 110, 230, 400. In an example, the operator provides input that the conveyor belt 130, 138, 204 needs to be moved or tracked in a direction to adjust the tension on the conveyor belt 130, 138, 204. Such tracking can be equal to a predetermined distance that one side of the conveyor roller 206 needs to move relative to the other side. Based on this input, the control system 110, 230, 400 then determines which actuator 220, 222, 414, 416 to adjust. Specifically, the control system 110, 230, 400 receives information related to belt tension resulting from the first and second actuators 220, 222, 414, 416. This information related to belt tension includes first and second actuator position, first and second actuator pressure, or the like that can be used to determine tension or loading on the conveyor belt 130, 138, 204. In one example, the control system 110, 230, 400 uses a look-up table to determine the tension being placed on the conveyor belt 130, 138, 204 by each actuator 220, 222, 414, 416. In one example, a threshold pressure is utilized to determine if the threshold tension would be exceeded. The control system 110, 230, 400 then prevents movement of an actuator that would result in a threshold tension exerted by that actuator to be exceeded. Instead, the control system 110, 230, 400 adjusts the actuator 220, 222, 414, 416 that does not result in a threshold tension to be exceeded upon adjustment. Once in a desired location, the first and second valves 228, 229, 418, 419 can operate as locking valves to prevent movement of the actuators 220, 222, 414, 416 during operation, even when leakage occurs within the actuators 220, 222, 414, 416.

Figure 5:
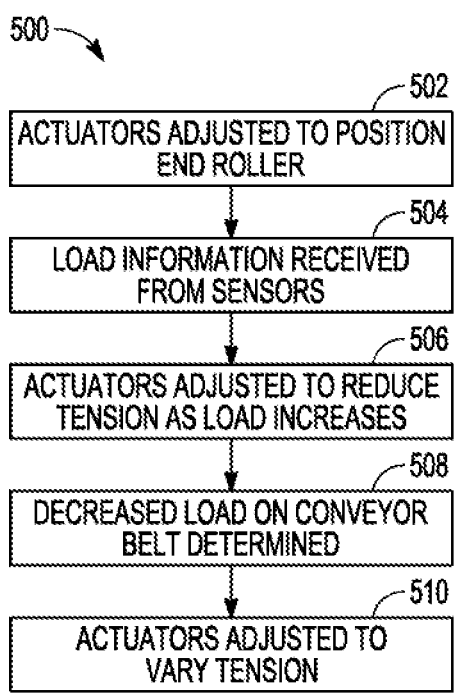
FIG. 5 shows a block flow diagram of an exemplary method for controlling tension on a conveyor belt.
Figure 6:
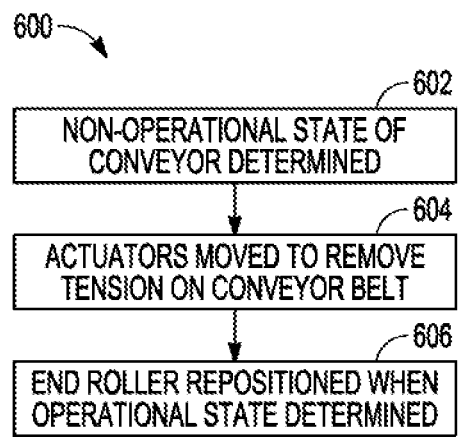
FIG. 6 shows a block flow diagram of an exemplary method for controlling tension on a conveyor belt.
Figure 7:
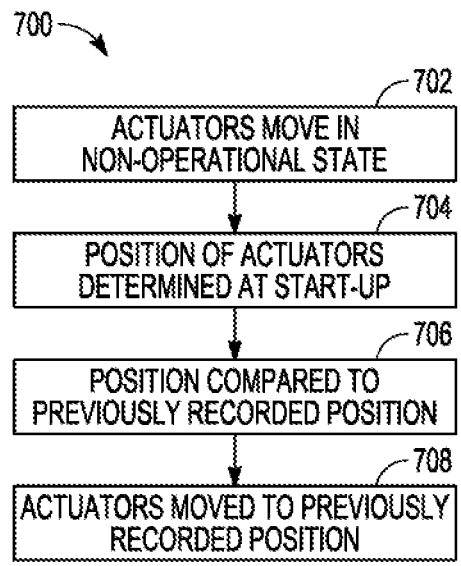
FIG. 7 shows a block flow diagram of an exemplary method for controlling tension on a conveyor belt.

FIGS. 5-7 illustrate exemplary methods of adjusting the position of a conveyor roller of a conveyor with a control system 110, 230, 400 to control tension in a conveyor belt 130, 138, 204 including during operation and non-operational states of the conveyor without operator inputs. This includes throughout loading and unloading of the conveyor belt 130, 138, 204.

Method 500 illustrates an exemplary method for controlling tension on a conveyor belt 130, 138, 204 during operation, or when the conveyor 124, 126, 202 is in an operational state. At 502, at start up, the control system 110, 230, 400 adjusts the actuators 220, 222, 414, 416 to position the end conveyor roller 206 at an operational position, or the position required to place an operating tension on the conveyor belt 130, 138, 204. In one example, the operating tension is the nominal tension of the conveyor belt 130, 138, 204. In another example, the operating tension is the tension required to maintain the operating tension on the conveyor belt 130, 138, 204 at a minimum amount required to avoid belt slippage. At 504, as the load on the conveyor belt 130, 138, 204 increases, the control system 110, 230, 400 receives load information from at least one system sensor 224, 226, 406, 408, 410, 412 and determines the load on the conveyor belt 130, 138, 204 is increasing.

At 506, the control system 110, 230, 400 is configured to then reduce, or vary the tension on the conveyor belt 130, 138, 204 by adjusting the actuators 220, 222, 414, 416 to maintain operating tension on the conveyor belt 130, 138, 204 at a constant tension, or constant operating tension throughout loading. Specifically, to reduce, or vary the tension, the actuators 220, 222, 414, 416 are adjusted to reposition the roller 206 to ensure the tension on the conveyor belt 130, 138, 204 remains constant as loading on the belt 130, 138, 204 itself increases. At 508, as load on the conveyor belt decreases, the control system 110, 230, 400 continues to monitor the at least one system sensor 224, 226, 406, 408, 410, 412, receives load information, and determines load on the conveyor belt 130, 138, 204 is decreasing. At 510, the control system 110, 230, 400 in response adjusts the actuators 220, 222, 414, 416 to vary tension on the conveyor belt 130, 138, 204. Again, by repositioning the roller 206 and varying tension resulting from the position of roller 206, tension on the conveyor belt 130, 138, 204 is maintained as a constant even as tension on the conveyor belt 130, 138, 204 caused by a material load varies. In this manner, a constant operating tension is maintained on the conveyor belt 130, 138, 204 at all times during operation. By keeping a constant operational tension on conveyor belt 130, 138, 204, wear associated with varying tension values is eliminated. In one embodiment this constant operational tension is the nominal tension of the conveyor belt 130, 138, 204. In another example, the constant operation tension is the minimum belt tension required to prevent slippage of the conveyor belt 130, 138, 204 under all loading conditions. Additionally, while in this example, a constant tension on the conveyor belt 130, 138, 204 is maintained, in other examples, a similar methodology is utilized to maintain the tension on the conveyor belt 130, 138, 204 below a threshold tension, or within a targeted tension range during operation. The target tension range in one embodiment is between the nominal tension and minimum tension required to prevent slippage of the conveyor belt 130, 138, 204 under all loading conditions.

FIG. 6 illustrates exemplary method 600 to reduce tension on a conveyor belt. At 602, when a conveyor 124, 126, 202 is in a non-operational condition or state, such as when a conveyer 124, 126, 202 is in a conveyor fold position, the control system 110, 230, 400 determines this unloaded, non-operational state. In the example, the non-operational state can include when the conveyor belt 130, 138, 204 is not rotating around the conveyor rollers 128A-C, 136A-E or when rotating around the conveyor rollers 128A-C, 136A-E, but without a load from the debris. At 604, once determined, the actuators 220, 222, 414, 416 are moved to reduce tension on the conveyor belt 130, 138, 204, or removing all tension from the conveyor belt 130, 138, 204. This is done by moving the end roller 206 to a non-operational position. At 606, when the conveyor starts operating again, or is taken out of the fold position, the control system may automatically position the end conveyor roller 206 back into its operational position from when in an operational state, in anticipation of loading on conveyor belt 130, 138, 204. In this manner, tension is added to the conveyor belt before operation, when the conveyor is in a non-operational state, to reduce potential slippage of the conveyor belt 130, 138, 204 as a result of the delay of detecting the load on the conveyor belt 130, 138, 204 when transitioning from a non-operational state to an operational condition. This minimizes undesired slippage during operational start up. In addition, by completely removing tension from the conveyor belt 130, 138, 204 in the non-operational state, wear on the belt is reduced.

FIG. 7 illustrates and exemplary method 700 of adjusting a conveyor belt 130, 138, 204. At 702, in this example, when a conveyor 124, 126, 202 is in a non-operational state, fluid pressure within an actuator leaks or is lost over time. As a result, the actuators 220, 222, 414, 416 move, resulting in unintended movement and repositioning of the end conveyor roller 206. At 704, when the conveyor 124, 126, 202 restarts and transitions into an operational state, the control system 110, 230, 400 determines the position of the actuators 220, 222, 414, 416 and thus the position of the end conveyor roller 206 based on the pressure, position, or the like relayed from actuator sensors 224, 226, 406, 408 coupled to the actuators 220, 222, 414, 416. At 706, the control system 110, 230, 400 compares sensed load information such as the sensed pressure, position, or the like of each actuator 220, 222, 414, 416 to recorded load information such as the required pressure or position to position the actuators 220, 222, 414, 416 in the last recorded position of each actuator

220, 222, 414, 416. At 708, based on the comparison, the actuators 220, 222, 414, 416 are moved to the previously recorded position, or operational position. In an example, the control system 110, 230, 400 determines that pressure has been lost and consequently actuates a valve 228, 229, 418, and/or 419 to provide fluid to increase the pressure within actuators 220, 222, 414, 416 as required to account for the lost fluid and position the conveyor roller 206.

Thus, provided is a cold planer 100 with a conveyor system 126 that includes a belt tensioning system 116, 200 operated by a control system 110, 230, 400 to move an end conveyor roller 206 of a conveyor 124, 126, 202 to control the tension on a conveyor belt 130, 138, 204. The control system 110, 230, 400 monitors sensors 224, 226, 406, 408, 410, 412, such as actuator sensors 224, 226, 406, 408 to determine the load on the conveyor belt 130, 138, 204 and position an end conveyor roller 206 of the conveyer 124, 126, 202 to maintain a desired tension on the conveyor belt 130, 138, 204 during start up, operation, and rest. This reduces wear and stress on the conveyor belt 130, 138, 204 over the lifetime of the conveyor 124, 126, 202, increasing conveyor belt life. This consequently reduces downtime for conveyor belt maintenance and replacement, thus decreasing costs and resources related to such replacement and downtime. The control system 110, 230, 400 eliminates human error in improperly tensioning the conveyor belt 130, 138, 204, and allows the operator to concentrate on other cold planer operations. In addition, the belt tensioning system 116, 200 allows for real time independent dynamic adjustments along with independent startup and rest adjustments to ensure desired tensioning is always on the conveyor belt 130, 138, 204, preventing undesired slippage or wear.

It will be apparent to those skilled in the art that various modifications and variations can be made to the disclosed cold planer 100, belt tensioning system 116, 200, and control system 110, 230, 400 without departing from the scope of the disclosure. Other embodiments of the cold planer 100, belt tensioning system 116, 200, and control system 110, 230, 400 will be apparent to those skilled in the art from consideration of the specification and practice of the methods disclosed herein. It is intended that the specification and examples be considered as exemplary only, with a true scope of the disclosure being indicated by the following claims and their equivalents.

What is claimed is:

1. A cold planer comprising:
   a frame;
   a milling system coupled to the frame, the milling system including a milling drum for milling a surface and delivering surface debris to a conveyor; and
   a conveyor system coupled to the frame comprising:
   the conveyor including a conveyor belt rotatable about a conveyor roller;
   a belt tensioning system coupled to the conveyor roller and including an actuator for moving the conveyor roller to vary tension on the conveyor belt; and
   one or more processors configured to:
   receive information related to the conveyor belt;
   adjust the actuator to move the conveyor roller based on the information related to the conveyor belt to maintain a constant operating tension on the conveyor belt.

2. The cold planer of claim 1, wherein the one or more processors are further configured to:
   adjust the actuator to move the conveyor roller when a load increases on the conveyor belt.

3. The cold planer of claim 1, wherein the actuator is a hydraulic cylinder.

4. The cold planer of claim 1, wherein the one or more processors are further configured to:
   receive the information related to the conveyor belt from an actuator sensor coupled to the actuator.

5. The cold planer of claim 4, wherein the actuator sensor is one of a position sensor or a pressure sensor.

6. The cold planer of claim 1, wherein the one or more processors are further configured to:
   compare the information related to the conveyor belt to recorded information to adjust the actuator to move the conveyor roller.

7. The cold planer of claim 1, wherein the one or more processors are further configured to:
   receive the information related to the conveyor belt from a motor sensor.

8. The cold planer of claim 1, wherein the one or more processors are further configured to:
   receive the information related to the conveyor belt from a belt sensor.

9. The cold planer of claim 1, wherein the constant operating tension is the nominal tension on the conveyor belt.

10. The cold planer of claim 1, the belt tensioning system includes a valve fluidly connected to the actuator to adjust the actuator.

11. A belt tensioning system for coupling to a roller of a conveyer comprising:
   a first actuator for moving a conveyor roller to vary tension on a conveyor belt;
   a second actuator for moving the conveyor roller to vary tension on the conveyor belt;
   one or more processors configured to:
   receive information related to the conveyor belt;
   determine that the conveyor belt is in an unloaded, non-operational state based on the received information; and
   adjust the first actuator or second actuator, in response to determining the unloaded, non-operational state, to move the conveyor roller from an operational position where there is tension on the conveyor belt to a non-operational position to remove tension on the conveyor belt.

12. The system of claim 11, further comprising:
   a first actuator sensor coupled to the first actuator;
   a second actuator sensor coupled to the second actuator; and
   wherein the one or more processors are further configured to:
   receive information related to the conveyor belt from the first actuator sensor; and
   receive information related to the conveyor belt from the second actuator sensor.

13. The system of claim 12, further comprising:
   a first valve coupled to the first actuator and a second valve coupled to the second actuator, to independently adjust the first and second actuators based on the information related to the conveyor belt.

14. The system of claim 11, wherein the one or more processors are further configured to:
   determine an operational state of the conveyor belt based on the information related to the conveyor belt; and
   adjust the first actuator or second actuator in response to determining the operational state to maintain the tension on the conveyor belt above a threshold tension during operation to prevent the conveyor belt from slipping on the conveyor roller.

15. The system of claim 14, wherein the one or more processors are further configured to:
   receive the information related to the conveyor belt from a motor sensor; and
   adjust the first actuator or second actuator to maintain the tension on the conveyor belt above the threshold tension based on information related to the conveyor belt received from the motor sensor.

16. The system of claim 11, wherein the one or more processors are further configured to:
determine an operational state of the conveyor belt based on the information related to the conveyor belt; and
adjust the first actuator or second actuator to move the conveyor roller from the non-operational position to the operational position in response to determining the operational state.

17. A cold planer comprising:
a frame;
a milling system coupled to the frame, the milling system including a milling drum for milling a surface and delivering surface debris to a conveyor; and
a conveyor system coupled to the frame comprising:
the conveyor including a conveyor belt rotatable about a conveyor roller;
a belt tensioning system coupled to the conveyor roller and including a first actuator for moving the conveyor roller to vary tension on the conveyor belt and a second actuator for moving the conveyor roller to vary tension on the conveyor belt; and
one or more processors configured to:
receive information related to the conveyor belt;
receive an input from an operator to move the conveyor roller;
select either the first actuator or second actuator to adjust based on the information related to the conveyor belt;
adjust the selected first actuator or second actuator to move the conveyor roller based on the input from the operator.

18. The cold planer of claim 17, wherein to select either the first actuator or second actuator to adjust based on the information related to the conveyor belt the one or more processors are further configured to:
determine an estimated pressure within the first actuator if the first actuator were to be adjusted;
compare the estimated pressure with a threshold pressure;
select the first actuator if the estimated pressure is below a threshold pressure; and
select the second actuator if the estimated pressure is above the threshold pressure.

19. The cold planer of claim 17, wherein the conveyor system further comprises:
a first valve fluidly coupled to the first actuator; and
a second valve fluidly coupled to the second actuator.

20. The cold planer of claim 19, wherein the one or more processors are further configured to:
lock the first actuator with the first valve to prevent movement of the first actuator; and
lock the second actuator with the second valve to prevent movement of the second actuator.

* * * * *